United States Patent [19]
Brezoczky et al.

[11] Patent Number: 5,783,882
[45] Date of Patent: Jul. 21, 1998

[54] CONDUCTIVE CONTACT FOR AN AIR BEARING SPINDLE

[75] Inventors: Blasius Brezoczky, San Jose; Ian C. Fry, Danville, both of Calif.

[73] Assignee: Phase Metrics, San Diego, Calif.

[21] Appl. No.: 775,254

[22] Filed: Dec. 30, 1996

[51] Int. Cl.$^6$ .................................................. H02H 7/00
[52] U.S. Cl. .................... 310/68 R; 310/254; 310/261; 360/98.8; 360/102
[58] Field of Search ....................... 310/68 R, 268, 310/261, 254; 360/98.8, 102, 97

[56] References Cited

U.S. PATENT DOCUMENTS

| | | | |
|---|---|---|---|
| 3,784,853 | 1/1974 | Wangsness | 310/178 |
| 4,101,945 | 7/1978 | Butsch | 360/102 |
| 4,589,707 | 5/1986 | Caye et al. | 308/10 |
| 4,627,288 | 12/1986 | Guzik et al. | 73/432.1 |
| 4,934,198 | 6/1990 | Doemens | 73/862.33 |

*Primary Examiner*—Steven L. Stephan
*Assistant Examiner*—Timothy A. Williams
*Attorney, Agent, or Firm*—Blakely Sokoloff Taylor & Zafman

[57] ABSTRACT

A spindle motor assembly which utilizes a reservoir of electrically conductive fluid to provide a conductive path through the assembly. The spindle motor assembly includes a spindle shaft that is located within a housing and rotated by an internal motor. The end of the spindle shaft is located within the reservoir. The reservoir also is electrically coupled to the housing. The electrically conductive fluid provides a conductive path between the spindle and the housing while minimizing the frictional forces on the spindle. The spindle may be coupled to a chuck that holds a magnetic disk within a disk certifier. The magnetic disk is electrically grounded to the housing through the chuck, the spindle and the electrically conductive fluid.

11 Claims, 2 Drawing Sheets

5,783,882

CONDUCTIVE CONTACT FOR AN AIR BEARING SPINDLE

BACKGROUND OF THE INVENTION

1. Field of the Invention

The present invention relates to a spindle motor that is grounded through an air bearing.

2. Description of the Related Art

Hard disk drives contain magnetic transducers that magnetize and sense the magnetic field of a rotating disk(s). The disks are typically tested before being assembled into a hard disk drive unit in an apparatus commonly referred to as a disk certifier. A disk certifier contains a spindle motor that is mounted to a test stand. The spindle motor contains a chuck that can be actuated to hold a magnetic disk. The spindle motor rotates the disk relative to a recording head that magnetizes and then senses the magnetic field(s) of the disk. The recording head is coupled to test circuitry which can process and analyze the disk based on the sensed magnetic field(s).

It is important to electrically ground the disk to minimize the noise of the test signal and to prevent an electrostatic build-up on the disk surface. The disk is typically grounded through the spindle motor. The spindle motor typically contains a conductive ball bearing that is pressed against the distal end of an internal spindle shaft. The ball provides a conductive path between the spindle and the test stand while allowing the spindle and disk to spin relative to the recording head. The recording head typically operates in the microvolt range. Any electrical noise can reduce the accuracy of the certifier. It is therefore imperative that the spindle have a reliable conductive path to the test stand.

It has been found that the ball bearing is a somewhat unreliable contact pad for the spindle motor. The electrical resistance of the contact pad is a function of the pressure between the ball bearing and the spindle. Vibrations in the spindle motor may vary the pressure and the resistance of the ground path. It has been found that variations in pressure will introduce electrical noise that degrade the accuracy of the certifier. Additionally, it is desirable to operate the spindle motor at high speeds in the range of 15,000 revolutions per minute (RPM). The frictional forces between the ball bearing and spindle shaft impede the rotation of the spindle motor. It would be desirable to provide a spindle motor which has a reliable ground path that produces lower frictional forces than contact pads of the prior art.

SUMMARY OF THE INVENTION

The present invention is a spindle motor assembly which utilizes a reservoir of electrically conductive fluid to provide a conductive path through the assembly. The spindle motor assembly includes a spindle shaft that is located within a housing and rotated by an internal motor. The end of the spindle shaft is located within the reservoir. The reservoir is also electrically coupled to the housing. The electrically conductive fluid provides a conductive path between the spindle and the housing while minimizing the frictional forces on the spindle. The spindle may be coupled to a chuck that holds a magnetic disk within a disk certifier. The magnetic disk is electrically grounded to the housing through the chuck, the spindle and the electrically conductive fluid.

DETAILED DESCRIPTION OF THE INVENTION

Figure 1:
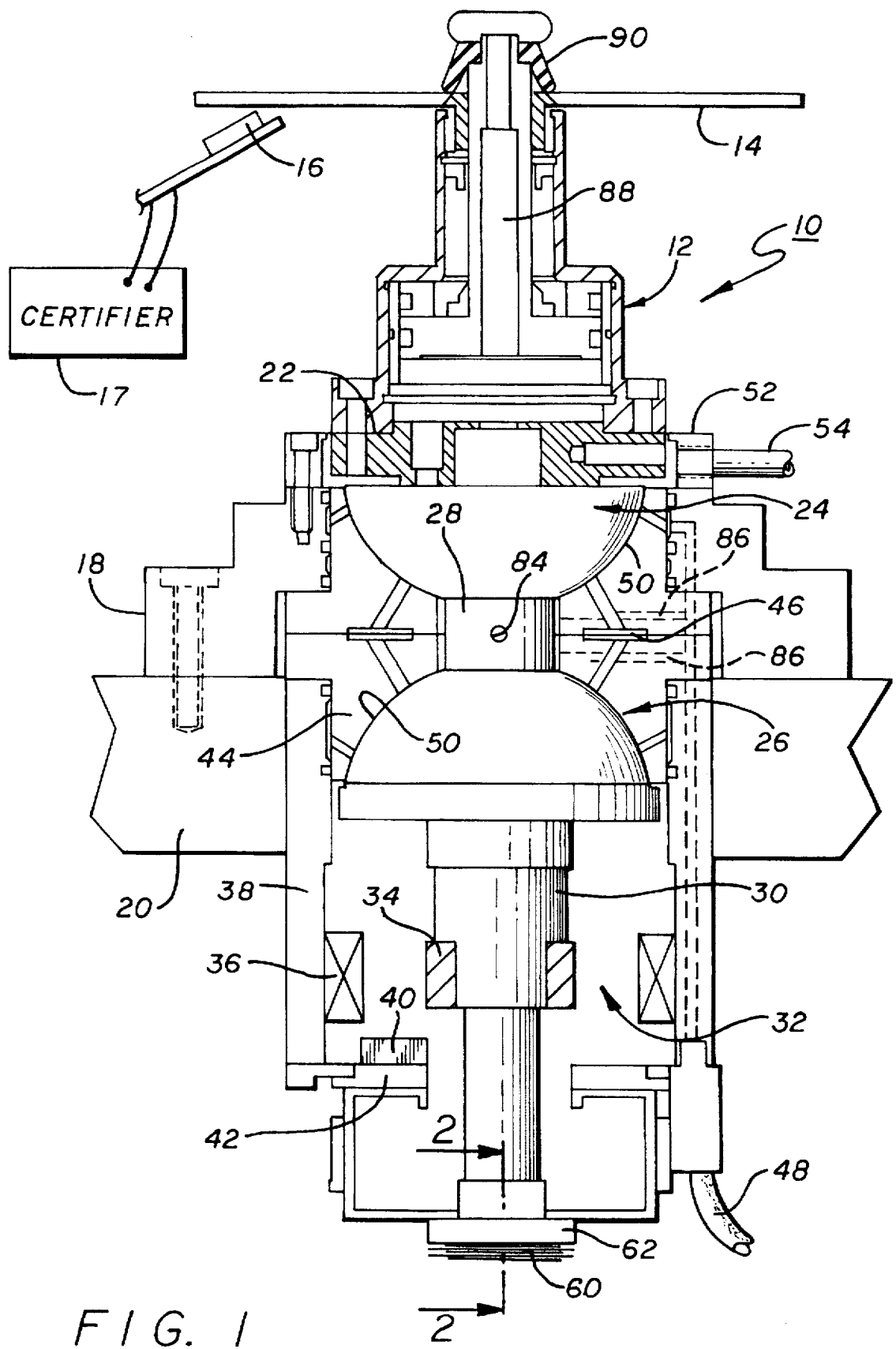
FIG. 1 is a cross-sectional view of a spindle motor of the present invention.

Referring to the drawings more particularly by reference numbers, FIG. 1 shows a spindle motor 10 of the present invention. The spindle motor 10 includes a chuck 12 that captures a magnetic disk 14. The motor 10 rotates the disk 14 relative to a magnetic recording head 16. The recording head 16 is attached to a certifier 17. The recording head 16 magnetizes and then senses the magnetic fields of the disk 14 in accordance with a disk certification test routine. The certifier 17 processes and analyzes the sensed magnetic fields to test the disk 14. The motor 10 may contain an outer housing collar 18 that is bolted to a table 20.

The chuck 12 is fastened to a mounting plate 22 that is attached to a first bearing 24. The first bearing 24 is connected to a second bearing 26 by a shaft 28. The second bearing 26 is attached to a spindle shaft 30 of an electric motor 32.

The electric motor 32 includes a magnet assembly 34 that is attached to the spindle shaft 30 and coupled to a coil assembly 36. The coil assembly 36 is fastened to an outer motor housing 38. The motor 32 rotates the spindle shaft 30, bearings 24 and 26 and chuck 12 to spin the disk 14. The motor 32 may rotate the spindle shaft 30 at speeds of at least 15,000 revolutions per minute (RPM). The motor 32 may have an encoder 40 that is mounted to an end plate 42. The end plate 42 can be rotated to adjust the position of the encoder 40.

The bearings 24 and 26 rotate relative to a housing 44. In one embodiment, the bearings 24 and 26 are both made of $Al_2O_3$, which is non conductive. The bearings 24 and 26 are each constructed as a segment of a sphere that is located within corresponding spherical shaped openings of the housing 44. The housing 44 has a plurality of air bearing channels 46 that are in fluid communication with a positive air pressure hose 48. The hose 48 provides air pressure that creates air bearings 50 between the housing 44 and the bearings 24 and 26. The motor 10 may have a vacuum gland 52 that is mounted to the outer collar 18. The vacuum gland 52 is attached to a vacuum hose 54. The vacuum hose 54 provides a return line for the air of the air bearings 50. The vacuum line 54 will also draw out any particles that are created by the bearing surfaces of the motor 10 to insure that the disk 14 is not contaminated.

Figure 2:
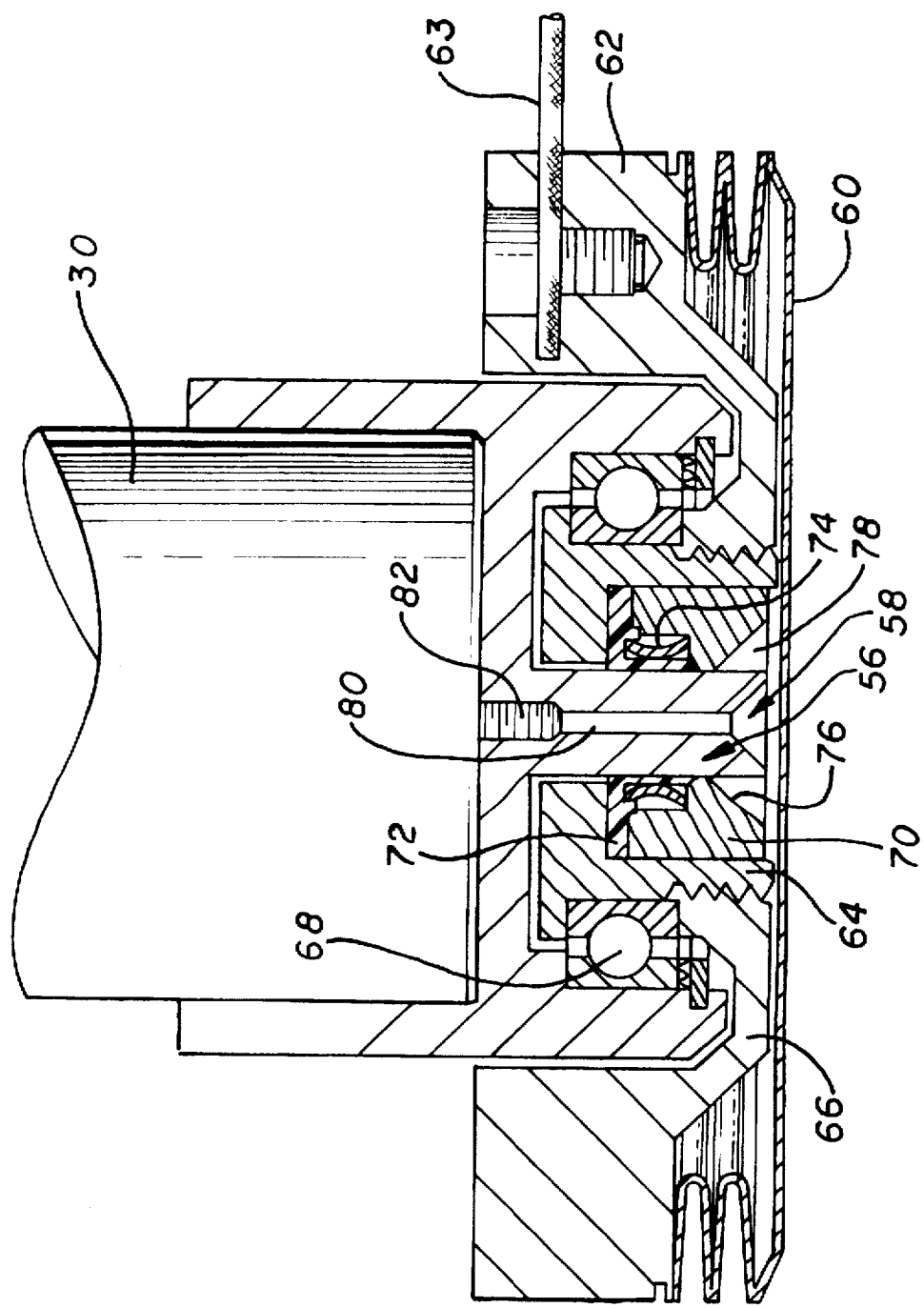
FIG. 2 is an enlarged cross-sectional view of a spindle shaft within a reservoir of electrically conductive fluid.

As shown in FIG. 2, the spindle shaft 30 has a tip 56 that is located within a reservoir 58 of electrically conductive fluid. In the preferred embodiment the electrically conductive fluid is mercury. Although it is to be understood that other types of electrically conductive fluids may be employed in the present invention. The fluid is located within a bellows 60 that is attached to a base plate 62. In the preferred embodiment the bellows 60 is constructed from a stainless steel material.

The fluid provides a conductive path from the spindle tip 56 to the base plate 62. In the preferred embodiment the conductive fluid should have a resistance no greater than 0.5 ohms. The base plate 62 may be grounded by a ground wire 63. The base plate 62 may also be attached to the housing 44 which is also electrically grounded. Although a separate base plate 62 is shown and described, it is to be understood that the bellows 60 may be grounded to any stationary grounded housing member.

The base plate 62 may include a cap 64 that is screwed into an outer block member 66. The cap 64 is coupled to the spindle shaft 30 by bearings 68. Within the cap 64 is an inner sleeve 70 that captures a seal 72. The seal 72 may be biased into the tip 58 by a spring 74. The sleeve 70 may have a frusto-conical surface 76 that forms a chamber 78 of fluid. The spindle tip 56 spins within the chamber 78. The reservoir 58 can be filled through a fill port 80 in the spindle tip 56. The fill port 80 is sealed with a plug 82. The bellows 60 compensates for variations in the volume of fluid. More particularly, the bellows 60 will expand and contract to compensate for changes in the temperature of the fluid, and variations in the amount of fluid introduced to the reservoir 58 through the fill port 80.

Referring to FIG. 1, the connecting shaft 28 of the bearings 24 and 26 may have a longitudinal air passage (not shown) that is in fluid communication with the chuck 12 and a pair of outer openings 84 located on opposing sides of the shaft 28. The outer openings 84 are in fluid communication with air channels 86 that are coupled to the air hose 48. The air hose 48 provides air pressure which actuates a piston 88 within the chuck 12. Actuation of the piston 88 moves a rubber collar 90 in an upward direction and releases the disk 14. When the air pressure is terminated the collar 90 returns to grasp the disk 14.

In operation, an operator actuates the chuck 12 to move the collar 90 in an upward direction. A disk 14 is then placed onto the chuck 12 and the collar 90 is released to hold the disk 14. The spindle motor 10 is then energized to spin the disk 14 relative to the recording head 16. The recording head 16 initially writes a test signal(s) onto the disk 14 by applying magnetic fields to the disk surface.

The disk 14 is electrically grounded through the chuck 12, spindle shaft 30, conductive fluid and base plate 62. After a certification routine, the operator again actuates the chuck 12 and replaces the disk 16 with another part, wherein the process is repeated. The electrically conductive fluid provides a reliable ground path that is less susceptible to variations in resistance because of vibrations and other mechanical loads, than ground pads of the prior art. Additionally, the conductive fluid produces less frictional forces on the spindle shaft than ball bearing contact pads typically found in the prior art.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A spindle motor, comprising:

a housing;

a reservoir of electrically conductive fluid that is electrically coupled to said housing;

a spindle located within said housing, said spindle having a tip that is located within said reservoir such that said electrically conductive fluid provides a conductive path between said spindle and said housing, said tip has a surface that is inclined to a longitudinal axis of said spindle; and, a motor that rotates said spindle relative to said housing.

2. The spindle motor as recited in claim 1, wherein said electrically conductive fluid is mercury.

3. The spindle motor as recited in claim 1, wherein said reservoir includes a bellows that contains said electrically conductive fluid.

4. The spindle motor as recited in claim 1, wherein an electrical resistance of said reservoir of electrically conductive fluid is no greater than 0.5 ohms.

5. The spindle motor as recited in claim 1, wherein said spindle rotates at a speed of at least 15,000 revolutions per minute.

6. A spindle motor for a certifier that test a magnetic disk, comprising:

a housing;

a reservoir of electrically conductive fluid that is electrically coupled to said housing;

a spindle located within said housing, said spindle having a tip that is located within said reservoir such that said electrically conductive fluid provides a conductive path between said spindle and said housing, said tip has a surface that is inclined to a longitudinal axis of said spindle;

a motor that rotates said spindle relative to said housing; and, a chuck that is connected to said spindle, said chuck captures the magnetic disk and is electrically connected to the magnetic disk so that the magnetic disk is electrically grounded to said housing through said spindle and said electrically conductive fluid.

7. The spindle motor as recited in claim 6, wherein said electrically conductive fluid is mercury.

8. The spindle motor as recited in claim 6, wherein said reservoir includes a bellows that contains said electrically conductive fluid.

9. The spindle motor as recited in claim 6, wherein an electrical resistance of said reservoir of electrically conductive fluid is no greater than 0.5 ohms.

10. The spindle motor as recited in claim 6, wherein said spindle rotates at a speed of at least 15,000 revolutions per minute.

11. The spindle motor as recited in claim 6, further comprising a certifier that electrically test the magnetic disk.

* * * * *